United States Patent
Kingsbury et al.

(10) Patent No.: US 9,630,173 B2
(45) Date of Patent: Apr. 25, 2017

(54) CATALYTIC CONVERTER SUBSTRATE (71) Applicant: IMPERIAL INNOVATIONS LIMITED, London (GB)

(72) Inventors: Benjamin Francis Knatchbull Kingsbury, Tunbridge Wells (GB); Zhentao Wu, Sutton (GB); Kang Li, Banstead (GB)

(73) Assignee: Imperial Innovations Limited, London (GB)

( * ) Notice: Subject to any disclaimer, the term of this patent is extended or adjusted under 35 U.S.C. 154(b) by 98 days.

(21) Appl. No.: 14/402,767

(22) PCT Filed: May 24, 2013

(86) PCT No.: PCT/GB2013/051389
§ 371 (c)(1),
(2) Date: Nov. 21, 2014

(87) PCT Pub. No.: WO2013/175239
PCT Pub. Date: Nov. 28, 2013

(65) Prior Publication Data
US 2015/0151290 A1 Jun. 4, 2015

(30) Foreign Application Priority Data
May 24, 2012 (GB) .................................. 1209155.9

(51) Int. Cl.
*B01D 50/00* (2006.01)
*B01J 35/04* (2006.01)
(Continued)

(52) U.S. Cl.
CPC .......... *B01J 35/04* (2013.01); *B01D 53/9454* (2013.01); *B01J 21/04* (2013.01); *B01J 23/10* (2013.01); *B01J 37/08* (2013.01); *B32B 1/08* (2013.01); *B32B 3/12* (2013.01); *B32B 18/00* (2013.01); *F01N 3/2828* (2013.01); *B32B 2262/105* (2013.01); *B32B 2605/08* (2013.01); *F01N 2330/36* (2013.01); *Y10T 29/49345* (2015.01); *Y10T 428/24149* (2015.01)

(58) Field of Classification Search
CPC ............... F01N 2330/36; F01N 3/2828; B01D 53/9495; B01J 21/04; B32B 2262/105; Y10T 428/24149
USPC ............ 422/168, 177, 180; 428/116; 55/523
See application file for complete search history.

(56) References Cited

U.S. PATENT DOCUMENTS 3,819,439 A 6/1974 Taylor
4,130,452 A 12/1978 Indri
(Continued)

FOREIGN PATENT DOCUMENTS

CN 1098029 A 2/1995
CN 1480256 A 3/2004
(Continued)

*Primary Examiner* — Tom P Duong
(74) *Attorney, Agent, or Firm* — Gable Gotwals (57) ABSTRACT

A catalytic converter substrate comprising a plurality of micro-structured hollow ceramic tubes, each tube having an inside surface and an outside surface, the inside surface having openings to micro-channels distributed radially throughout the tube cross-section, the micro-channels extending from the openings in the inside surface towards the outside surface.

24 Claims, 7 Drawing Sheets

(51) Int. Cl.
  *B01D 53/94* (2006.01)
  *B01J 37/08* (2006.01)
  *B01J 21/04* (2006.01)
  *B01J 23/10* (2006.01)
  *B32B 1/08* (2006.01)
  *B32B 3/12* (2006.01)
  *B32B 18/00* (2006.01)
  *F01N 3/28* (2006.01)

(56) References Cited

U.S. PATENT DOCUMENTS

| | | | |
|---|---|---|---|
| 4,175,153 A | | 11/1979 | Dobo et al. |
| 4,882,223 A | * | 11/1989 | Aptel .................... A23C 9/1422 |
| | | | 210/500.22 |
| 5,352,481 A | | 10/1994 | Bak et al. |
| 5,649,517 A | * | 7/1997 | Poola ..................... B01J 19/088 |
| | | | 123/585 |
| 6,887,809 B1 | | 5/2005 | Adler |
| 2003/0135971 A1 | * | 7/2003 | Liberman .......... B01D 67/0041 |
| | | | 29/419.1 |
| 2003/0154700 A1 | * | 8/2003 | Rothig ............... B01D 39/2027 |
| | | | 55/523 |
| 2005/0069469 A1 | | 3/2005 | Fu et al. |
| 2005/0100470 A1 | | 5/2005 | Lefebvre et al. |
| 2008/0241032 A1 | | 10/2008 | Zuberi |
| 2011/0274601 A1 | | 11/2011 | Boorse |

FOREIGN PATENT DOCUMENTS

| | | |
|---|---|---|
| DE | 3536309 | 6/1986 |
| EP | 2357440 A1 | 8/2011 |
| GB | 2502953 A | 12/2013 |
| JP | 06106035 A | 9/1992 |
| JP | 2005307944 A | 11/2005 |
| JP | 2010104928 A | 5/2010 |
| WO | 02055189 A2 | 7/2002 |
| WO | 03070662 | 8/2003 |
| WO | 2007007051 A1 | 1/2007 |
| WO | 2013175239 | 11/2013 |

* cited by examiner

Embodiments

| Inner diameter (mm) | Outer diameter (mm) | Wall thickness (mm) | OFA | Pressure drop (Pa) | Cells per cm2 | Geometric surface area (m2/m3) |
|---|---|---|---|---|---|---|
| 1 | 2 | 0.5 | 0.227 | 629.03 | 29 | 37,193 |
| 1 | 1.6 | 0.3 | 0.354 | 402.58 | 45 | 30,219 |
| 1.9 | 2.5 | 0.3 | 0.524 | 75.42 | 18 | 20,947 |
| 2 | 2.5 | 0.25 | 0.580 | 61.43 | 18 | 17,852 |
| 2 | 3 | 0.5 | 0.403 | 88.46 | 13 | 27,550 |
| 2.5 | 3 | 0.25 | 0.630 | 36.23 | 13 | 15,153 |

Standard commercial uncoated monoliths

| Wall thickness (mm) | OFA | Pressure drop (Pa) Square channel | Cells per cm2 | Geometric surface area (m2/m3) |
|---|---|---|---|---|
| 0.109 | 0.8354 | 152 | 62 | 2,875 |
| 0.165 | 0.7569 | 198 | 62 | 2,750 |
| 0.0889 | 0.8359 | 268 | 93 | 3,500 |

GSA (m²/m³) as a function of outer diameter and wall thickness

| Wall (mm) | Outer diameter (mm) | | | | |
|---|---|---|---|---|---|
| | 1 | 2 | 2.5 | 3 | 4 |
| 0.1 | 17,852 | 9,422 | 7,617 | 6,392 | 4,835 |
| 0.2 | 31,738 | 17,853 | 14,600 | 12,343 | 9,422 |
| 0.3 | 41,656 | 25,291 | 20,947 | 17,853 | 13,762 |
| 0.4 | 47,607 | 31,738 | 26,660 | 22,922 | 17,853 |
| 0.5 | | 37,193 | 31,738 | 27,551 | 21,696 |
| 0.6 | | 41,656 | 36,181 | 31,738 | 25,292 |
| 0.7 | | 45,127 | 39,990 | 35,485 | 28,639 |
| 0.8 | | 47,607 | 43,164 | 38,791 | 31,738 |
| 0.9 | | 49,095 | 45,703 | 41,656 | 34,590 |
| 1.0 | | | 47,607 | 44,081 | 37,194 |

Pressure drop (Pa) as a function of outer diameter and wall thickness

| Wall (mm) | Outer diameter (mm) | | | | |
|---|---|---|---|---|---|
| | 1 | 2 | 2.5 | 3 | 4 |
| 0.1 | 387 | 60 | 35 | 23 | 12 |
| 0.2 | 1,223 | 97 | 51 | 31 | 15 |
| 0.3 | 6,190 | 165 | 76 | 43 | 19 |
| 0.4 | 99,040 | 306 | 119 | 61 | 24 |
| 0.5 | | 634 | 196 | 89 | 31 |
| 0.6 | | 1,547 | 347 | 136 | 41 |
| 0.7 | | 4,891 | 676 | 218 | 55 |
| 0.8 | | 24,760 | 1,510 | 371 | 76 |
| 0.9 | | 396,159 | 4,125 | 688 | 108 |
| 1.0 | | | 15,846 | 1,426 | 158 |

- ▨ Optimized for GSA: Very large GSA and pressure drop comparable or less than monolith substrate
- ▨ Optimized for Pressure Drop: Very low pressure drop and GSA larger than monolith substrate
- ▨ Optimized for GSA and Pressure Drop: High GSA and low pressure drop

FIG. 11

CATALYTIC CONVERTER SUBSTRATE

CROSS-REFERENCE TO RELATED APPLICATIONS

This application is the United States National Phase of PCT Patent Application No. GB2013/051389 filed 24 May 2013, which claims priority to Great Britain Application No. 1209155.9 filed 24 May 2012, which are incorporated herein by reference.

BACKGROUND OF THE INVENTION

The present invention relates to a catalytic converter substrate comprising a plurality of micro-structured tubes, a catalytic converter, a kit for a catalytic converter, a method for fabricating a catalytic converter substrate, a method of retro fitting a catalytic converter and an internal combustion engine including a catalytic converter substrate comprising a plurality of micro-structured tubes.

Catalytic converters are known for their use in automotive exhaust gas treatment. They commonly consist of two primary components, a substrate and catalytically active washcoat.

When designing a catalytic converter, the principle concerns are converter cost, emissions targets and engine performance which are ultimately determined by the properties of the substrate and the catalyst.

The main purpose of the substrate, which consists of a large number of channels through which the exhaust gases pass, is to provide a large geometric surface area (GSA) onto which the catalytically active washcoat can be deposited. This is because the GSA of a catalyst substrate is a key factor in determining both the quantity of the catalyst that is required and the conversion efficiency of the converter. Conversion efficiency can be increased by increasing catalyst loading, however the additional benefit of increased catalyst loading becomes substantially reduced as the quantity is increased, due to diffusion limitations within the washcoat. Therefore by increasing the GSA it is possible to reduce the quantity of catalyst and increase the contact between the catalyst and the exhaust gas.

It is also important that the substrate provides beneficial flow hydrodynamics, in terms of reducing the negative effect of back pressure in the exhaust system and improving gas-catalyst contact.

A known catalytic converter consists of a ceramic honeycomb monolith substrate and a platinum group metal (PGM) catalytically active washcoat, and operates in a so-called three way catalyst system (TWC) which converts hydrocarbons, carbon monoxide and nitrogen oxides to carbon dioxide, water and nitrogen.

In practice this arrangement is limited in its conversion ability by the GSA of the ceramic honeycomb monolith substrate. It is also known that due to the rapid thermal cycling of converters, crack formation may arise in the current monolith designs. This places a restriction on the material selection for the monolith design, driven by the characteristic of a low thermal expansion coefficient.

It is known that the maximum GSA of a monolith substrate achieved to date is a figure approaching 5000 $m^2/m^3$ for automotive applications.

The present invention seeks to overcome these problems. It is an object of the present invention to provide an improved substrate for a catalytic converter, having a high GSA and offering beneficial flow dynamics.

Hollow fibre membranes have been used in the following papers; Wang et al (2009), Industrial & Chemical Engineering Research 48, 510; Tan et al, Preparation and characterisation of inorganic hollow fibre membranes, J Membr Sci, 2001, 188: 87-95; Preparation of LSCF ceramic hollow fibre membranes for oxygen production by a phase-inversion/ sintering technique. Ind Eng Chem Res, 2005, 44: 61-66; Yttria stabilised zirconia hollow fiber membranes. J Am Ceram Soc 2006, 89: 1156-1159 and A phase inversion/ sintering process to fabricate nickel/yttria-established zirconia hollow fibers as the anode support for micro-tubular solid oxide fuel cells, J Power Sources, 2008, 183; 14-19. In these applications, the oxygen permeability/conductivity of the tubes are of great benefit.

The inventors have discovered that the large surface area provided by these tubes can also be beneficial in other applications.

According to a first aspect of the present invention, there is provided a catalytic converter substrate comprising a plurality of micro-structured tubes, each tube having an inside surface and an outside surface, at least one of the inside surface and the outside surface having openings to micro-channels extending generally radially through the tube cross-section, said micro-channels extending from said openings in at least one surface towards the other surface.

Preferably, the substrate is coated with a catalytically active coating, such as a washcoat.

Preferably, the micro-structured tubes are ceramic.

The micro-channels may extend from either or both of the inside surface and/or the outside surface.

Preferably, the micro-channels extend from the inside surface.

The micro-structured tubes of the substrate may be fabricated using an advanced combined phase inversion and sintering technique. Advantageously, this allows the choice of materials to be based on factors that improve the mechanical, thermal and chemical properties of the substrate and improve the compatibility with the washcoat. The micro-channels can further enhance mass and heat transfers.

The micro-channels can pass through the entire tube wall. However, in an optional embodiment, the tube comprises two distinct layers. Preferably, the first layer containing the micro-channels extends from the inside surface and terminates within the tube cross-section and a second solid layer is formed at the outside surface. Having the tube comprising two distinct layers, known as an asymmetric structure, provides a preferred combination for use as a vascular substrate. The first layer containing the micro-channels provides an increased GSA over the known honeycomb monolith substrate whilst also enhancing the mass and heat transfers as mentioned above. The second, solid layer provides additional rigidity to the substrate.

In a preferred embodiment the substrate comprises one or more of: cordierite; zirconia; yttrium stabilised zirconia; titania; silicon carbide; clay; alumina; or metals including stainless steel, such as FeCr alloys or other alloys of iron; alloys of aluminium; or other sintered metals. Cordierite has a low thermal expansion coefficient, which can be beneficial, since rapid thermal cycling that takes place in automotive applications.

In preferred embodiments, the internal diameter of the micro-structured tubes is in the range 0.5 to 4 mm. More preferably, the internal diameter is in the range 0.8 to 4 mm. Selection of the internal diameter allows a tailoring of substrate according to the requirements of resistance to exhaust gas flow and GSA.

In a preferred embodiment the wall thickness (i.e. the combined thickness of both the first and second layers) of the micro-structured tubes is in the range 100 μm to 1 mm, and preferably in the range 100 μm to 500 μm. Embodiments with wall thickness in the range 200 μm to 300 μm have been considered.

A particularly beneficial micro-structured tube may have an outer diameter of 5 mm, and an inner diameter of 4 mm.

Although, the skin thickness may occupy any proportion of the wall thickness, in a preferred embodiment the skin thickness (i.e. the thickness of the second layer) is up to 70% of the wall thickness.

In a preferred embodiment the micro-channels have an entrance diameter of between 5-200 μm.

The micro-channels preferably extend at least 30% of the wall thickness. More preferably, the micro-channels extend at least 80% of the wall thickness.

Preferably, the geometric surface area (GSA) of a catalytic convertor substrate formed from a plurality of micro-structured tubes is greater than 8,000 $m^2/m^3$. More preferably, the geometric surface area (GSA) of a catalytic convertor substrate formed from a plurality of micro-structured tubes is greater than 15,000 $m^2/m^3$. Most preferably, the geometric surface area (GSA) of a catalytic convertor substrate formed from a plurality of micro-structured tubes is greater than 19,000 $m^2/m^3$.

Embodiments have been considered in which the GSA is in the range 8,000 $m^2/m^3$ to 35,000 $m^2/m^3$.

Embodiments of the present invention can provide a GSA several times greater than known catalyst substrates.

According to a second aspect of the present invention, there is provided a catalytic converter comprising a substrate according to the first aspect of the invention and having a catalytically active coating, an insulation mat and a substrate housing.

The catalytically active coating may be applied to some or all of the interior of the tubes of the substrate. Alternatively, or in addition, the catalytically active coating may be applied to some or all of the exterior of the tubes.

In some embodiments, the catalytically active coating may completely cover the substrate. In some embodiments, the catalytically active coating may completely cover each tube of the substrate.

Since the GSA is increased by use of the micro-structured fibre substrate, the quantity of catalyst required to do the same job is decreased substantially.

In a preferred embodiment the catalytically active coating is a washcoat.

In a preferred embodiment the coating comprises a precious metal. However, the GSA provided by the micro-structured fibre substrate can be large enough to allow non-precious metals to be used as a coating. For example, nickel may be used as a coating.

In a preferred embodiment the precious metal is a platinum group metal.

According to a third aspect of the present invention there is provided a kit for a catalytic converter, said kit comprising a substrate according to the first aspect of the invention, an insulation mat and a substrate housing formed to receive the substrate and mat with a tight fit.

According to the fourth aspect of the present invention there is provided a method for fabricating a catalytic converter substrate comprising a plurality of micro-structured tubes comprising the steps of; forming a plurality of micro-structured tubes using phase inversion and sintering, gathering the plurality of fibres and adhering the fibres together in an array having a cross-sectional shape arranged to conform with a catalyst housing.

Advantageously, since the substrate is formed of a plurality of gathered micro-structured tubes, the cross-sectional shape of the substrate can be determined by the arrangement of the gathered tubes. Thus, a large variety of cross-sectional shapes can be easily manufactured.

Substrates with advanced micro-structures can be prepared in a cost effective and efficient way. Using the phase inversion and sintering technique, substrates can be prepared from a wide range of materials, such as those listed above. Moreover, the formation mechanism for high GSA micro-structures is independent of material, therefore this technique is not subject to the same material constraints which exist for prior art substrate fabrication techniques.

According to a fifth aspect of the invention, there is provided, a method of retro-fitting
a catalytic converter comprising the steps of:
(a) forming micro-structured tubes into a bundle,
said tubes having an inside surface and an outside surface, at least one of the surfaces having openings to micro-channels said micro-channels extending from said openings in the at least one surface towards the other surface, said tubes having a catalytically active washcoat applied thereon;
(b) lining a substrate housing with an insulation mat;
(c) housing said bundle of micro-structured tubes in a lined substrate housing;
(d) fitting the substrate housing to an existing exhaust system.

According to a sixth aspect of the invention, there is provided an exhaust system for an internal combustion engine incorporating a catalytic converter in accordance with the second aspect of the invention.

Embodiments of the present invention will now be described by way of example and with reference to the accompanying drawings, in which.

Figure 1:
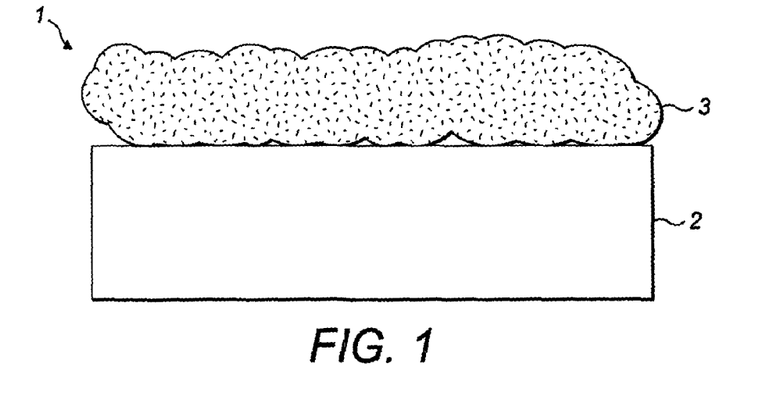
FIG. 1 shows a schematic illustration of the layout and function of a prior art catalytic converter.

A known prior art catalytic converter 1 (see FIG. 1) commonly comprises a ceramic substrate 2 with a precious metal catalytic washcoat 3 layered on top. This is most commonly employed in a three way catalyst system (TWC) which converts hydrocarbons, carbon monoxide and nitrogen oxides to carbon dioxide, water and nitrogen, represented in the following equation:

$$HC, CO, NO_x \rightarrow N_2, H_2O, CO_2$$

Figure 2:
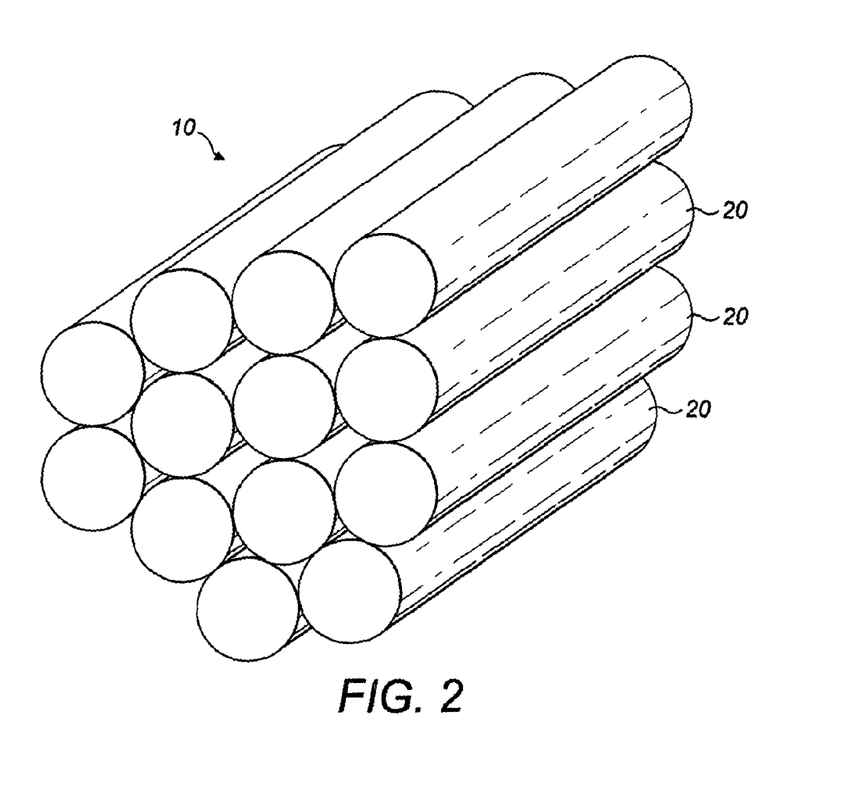
FIG. 2 shows a perspective view of the catalytic converter substrate in accordance with the first aspect of the present invention.
Figure 5A:
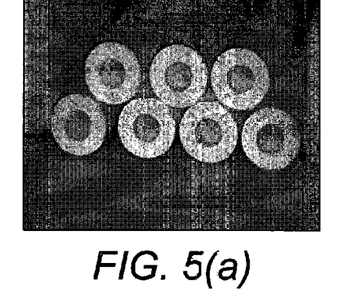
FIG. 5a shows a photographic image of the hollow fibres of the ceramic hollow fibre substrate.

The catalytic converter substrate 10 of the present invention (see FIGS. 2 and 5*a*) comprises a plurality of micro-structured hollow ceramic tubes 20 arranged in a parallel tightly packed bundle. The tubes 20 may be glued together in order to form a rigid substrate. Alternatively, they may be bound together using a strap or, as described below, an insulation mat 70. The tubes 20 are of similar length and each has an internal diameter of approximately 0.8 mm.

Figure 3:
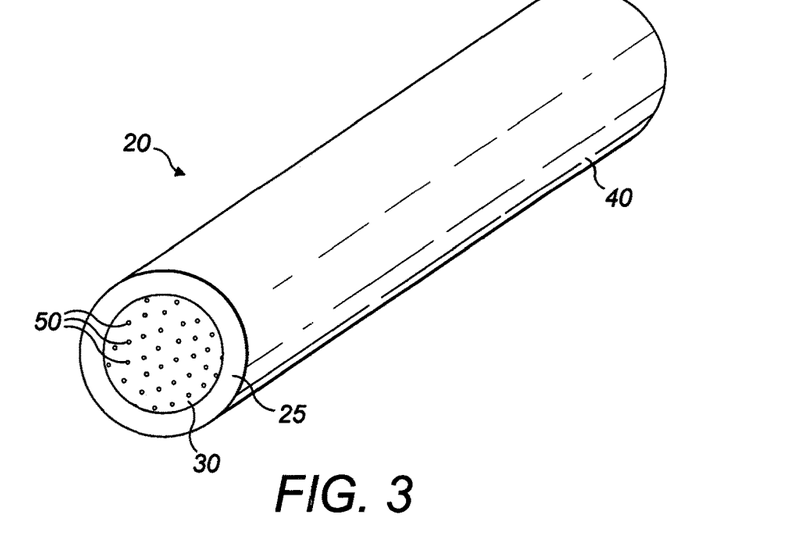
FIG. 3 shows a perspective view of a micro-structured hollow ceramic tube of FIG. 2.
Figure 4:
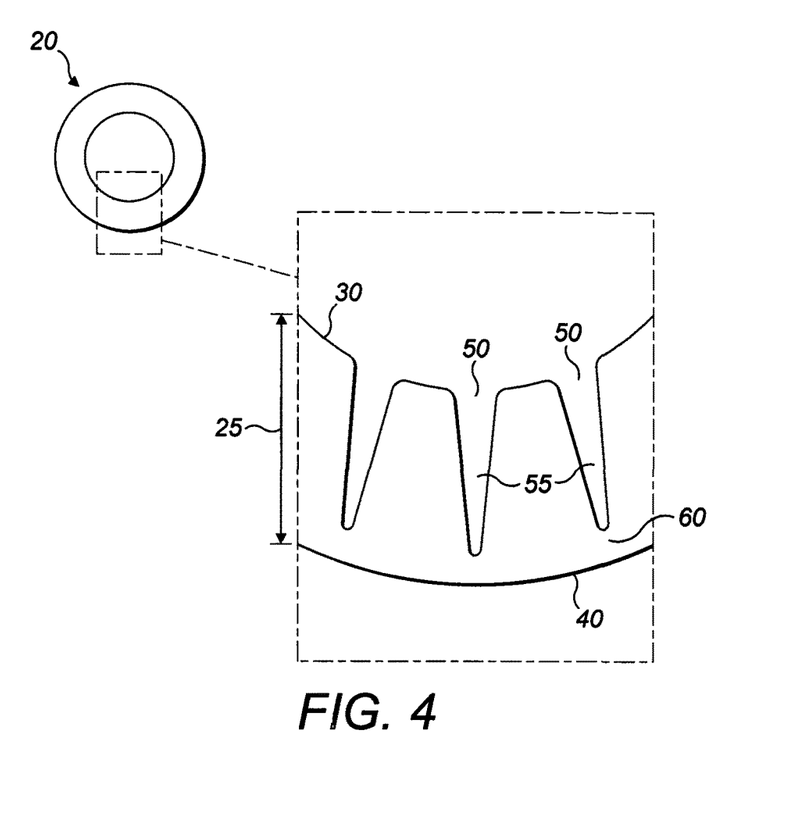
FIG. 4 shows a front elevation of a micro-structured hollow ceramic tube of FIG. 2 with an enlarged view of a partial cross section.
Figure 5B:
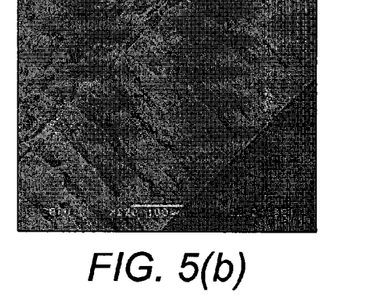
FIG. 5b shows a scanning electron micrograph of the cross section of the fibres of the ceramic hollow fibre substrate.
Figure 5C:
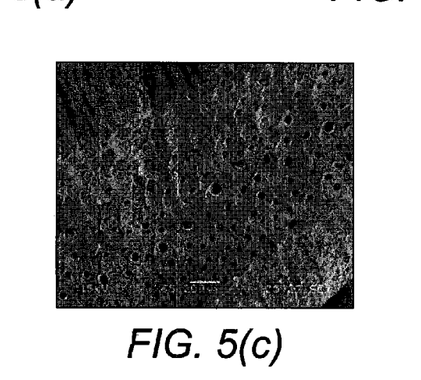
FIG. 5c shows a scanning electron micrograph of the inner surface of the fibres of the ceramic hollow fibre substrate.
Figure 6:
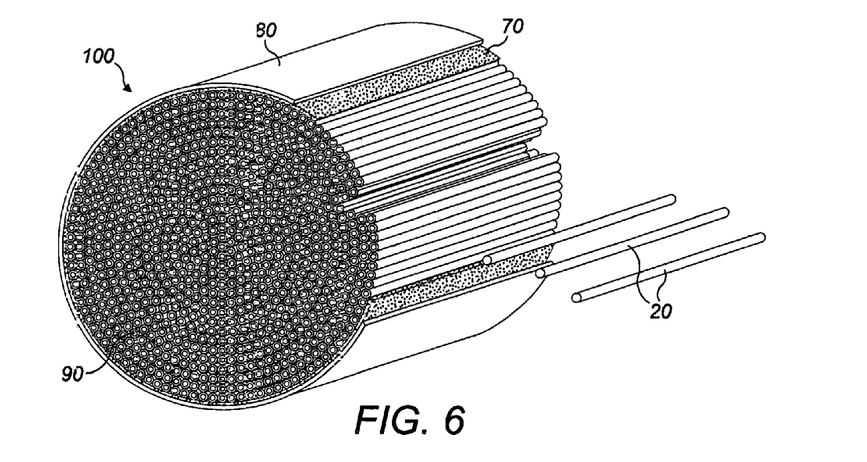
FIG. 6 shows a perspective view of the catalytic converter in accordance with the second aspect of the invention with a cut-away section for clarity.

Each micro-structured hollow ceramic tube 20 (see FIG. 3) has an inside surface 30 and an outside surface 40, bounding a substantially uniform tube wall 25 which has a thickness of approximately 300 μm. The inside surface 30 features a substantially uniform pattern of micro-channel openings 50 (see also FIGS. 4 and 5*a*) which extend radially into the tube wall 25 as micro channels 55, to a depth of at least 30% of the wall thickness. The micro-channels 55 may be described as being finger-like microvoids. The diameter of the micro-channel openings 50 is from 5 μm to 200 μm. As the micro-channels 55 terminate inside the tube wall 25, a skin zone 60 of solid tube from the outside surface 40 of the tube 20 may extend up to 70% of the tube wall 25 thickness (see also FIG. 5*b*). (However, in some embodiments, the channels may extend entirely through the tube wall.)

Figure 8:
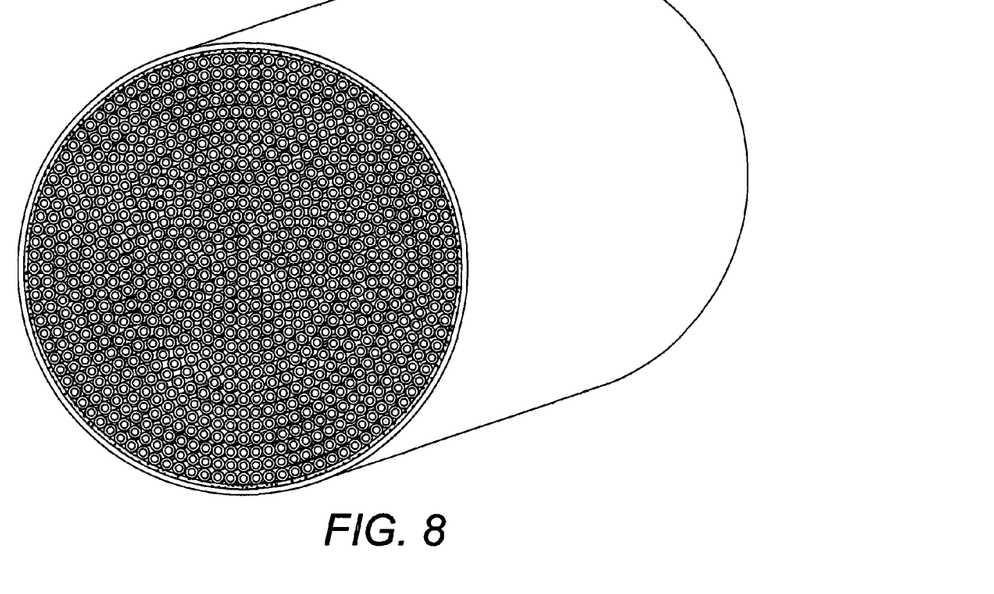
FIG. 8 shows a perspective view of the catalytic converter in accordance with the second aspect of the invention.

The catalytic converter 100 according to the second aspect of the present invention (see FIGS. 3 and 8) comprises a substrate 90 comprising a cylindrical, tightly packed, bundle of a plurality of micro-structured hollow ceramic tubes 20 arranged in a parallel formation, having a catalytically active coating (not shown), an insulation mat 70 wrapped around the tubes 20 and a substrate housing 80 surrounding the insulation mat 70. The ends of the tubes 20 are exposed to the atmosphere at either end. In use, the housing 80 forms part of an internal combustion engine exhaust system and is arranged so exhaust gasses pass along the tubes 20. The substrate housing 80 may communicate with an inlet tube. Such an inlet tube may communicate with the exhaust manifold of an internal combustion engine. The substrate housing 80 may communicate with an outlet tube for carrying the exhaust gases to atmosphere.

Figure 9:
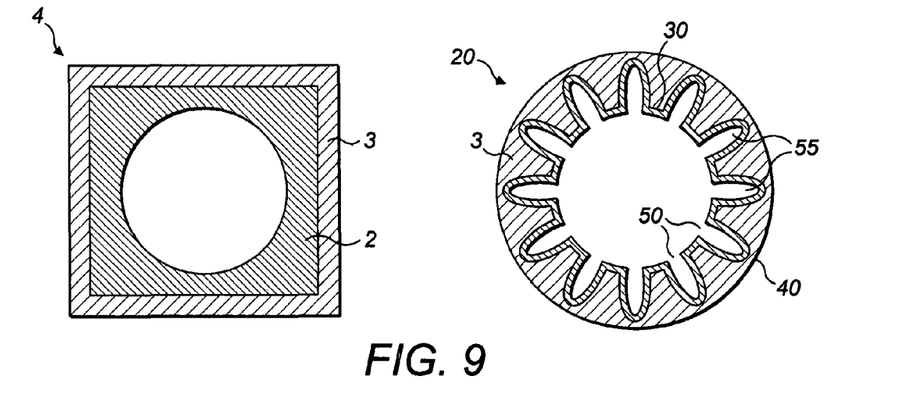
FIG. 9 shows a schematic representation of the difference between a monolithic prior art substrate and the substrate of the first aspect of the present invention.

A comparison of the cross sections of a prior art monolithic catalytic converter 4 and the hollow fibre catalytic substrate tube 20 with a catalytic washcoat 3 (see FIG. 9) shows the difference in geometry. The monolithic substrate 2 has a square cross section outer surface and, after wash-coating, a cylindrical inside surface. This results in a non-uniform thickness of catalytic washcoat. The hollow fibre substrate 20, however, has a cylindrical outside surface and a variable inside surface featuring a cylindrical shape, interrupted by a uniform distribution of troughs corresponding to the micro-channels 50 previously described. The catalytic washcoat 3 is deposited on this inside surface 30. The net effect of the differing cross sections is a greater surface area of catalyst in contact with the atmosphere in the inside of the tube 20 for the hollow fibre design as compared to the monolith design, and the use of a smaller quantity of catalytic washcoat 3 to achieve this effect. Also, the micro-channels 50 increase the surface roughness of the tubes which promotes turbulent flow conditions through the tubes, enhancing the effect of the catalyst by increasing contact between exhaust gas and catalyst coating. In the prior art arrangement, the majority of the flow cross-section through the monolith is laminar which reduces the opportunity for exhaust gas-catalyst contact. The increased GSA and increased roughness, promoting mixing act synergistically to improve the performance of the catalyst. This allows a reduction in the amount of catalyst required for a particular performance level. As the catalyst is typically platinum, any reduction in the amount of catalyst required can significantly reduce the cost of any particular catalytic converter.

Some attempts have been made in existing catalytic converters to promote turbulent conditions but those have been done at a macroscopic, mechanical level by including baffles and other such physical formations. Whilst these can generate turbulent eddies in the airflow, turbulent flow is not maintained along the length of the monolith.

The substrate material choice is not restricted to cordierite. Any thermally stable ceramic to which the phase inversion/sintering method can be applied and which will produce a micro-structured hollow ceramic tube will be suitable.

The phase inversion and sintering process described above is known in the prior art. For completeness, there follows a brief example of the steps of the process.

Figure 10:
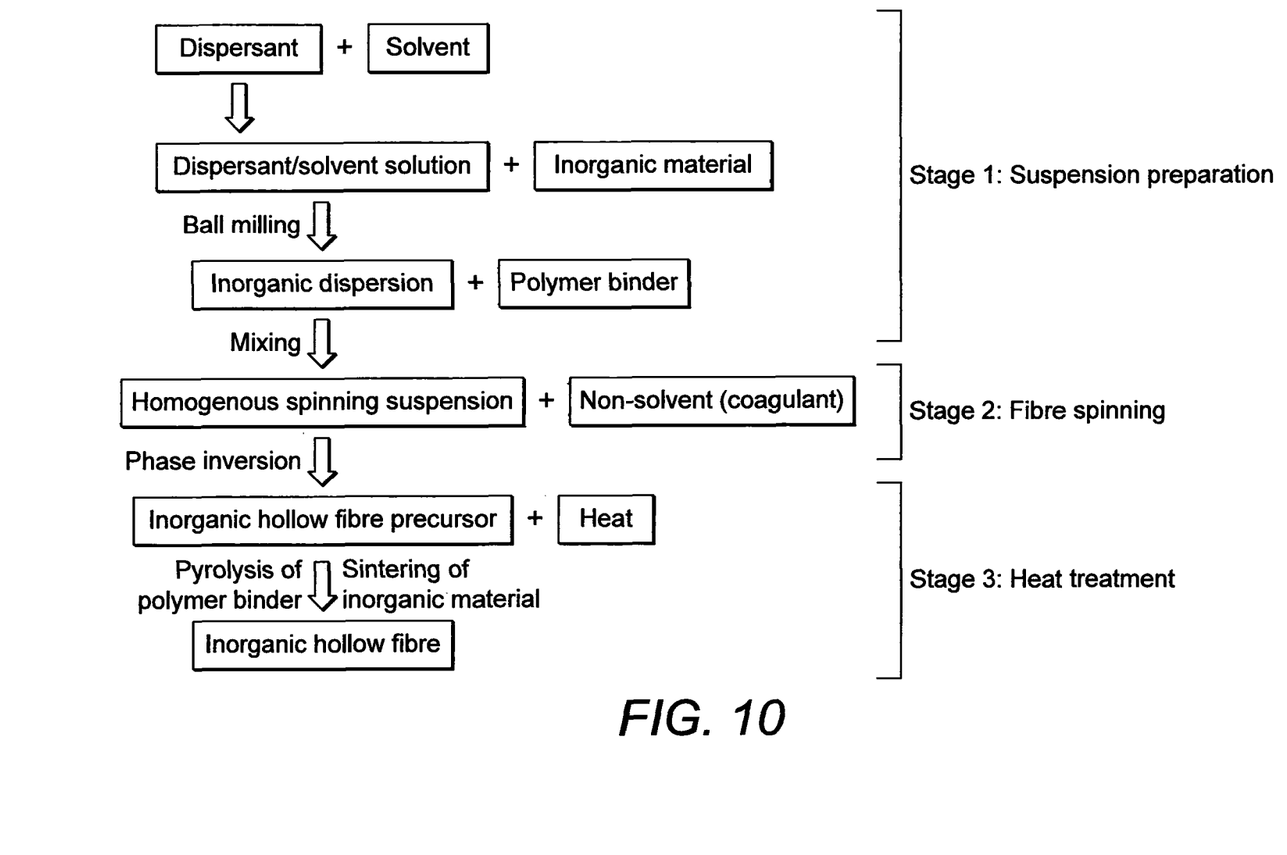
FIG. 10 shows a flow diagram of the stages involved in the preparation of an example of an inorganic hollow fibre.

A flow diagram showing the stages involved in the preparation of an inorganic hollow fibre is shown in FIG. 10. The parameters (A to U) for three examples are given below.

A dispersant (D) is dissolved in a solvent (C) prior to the addition of inorganic material (A). This forms a dispersion. In one embodiment, the inorganic material is in the form of a powder with a particle distribution of 1:2:7 (0.01 μm:0.05 μm:1 μm).

The dispersion is rolled/milled. For example, using 20 mm agate balls milling for 48 hours with approximately twice as much alumina/agate by weight as dispersion. A polymer binder (B) is added, after which milling may be continued for up to a further 48 hours.

Preferably, the resulting suspension is transferred to a gas tight reservoir and degassed under vacuum until no bubbles are seen at the surface.

The suspension is then extruded to form a tube (for example, using a 200 ml Harvard stainless steel syringe through a tube-in-orifice spinneret) with an inner diameter (F), and an outer diameter (E). The tube is extruded into a coagulation bath containing a non-solvent (K) for the polymer binder. Optionally, an air-gap (G) of up to 30 cm is provided. If required, a different internal coagulant (I) may be used with a controlled flow rate (J).

The solvent (C) is miscible with at least one of the non-solvent (K) and the internal coagulant (I).

The extrusion rate (H) of the spinning suspension and the flow rate of the internal coagulant is preferably accurately controlled and monitored, for example by two individual Harvard PHD 22/2000 Hpsi syringe pumps to ensure the uniformity of the prepared precursor fibres.

The fibre precursors may be left in the external coagulation bath for an extended period (for example, overnight) to allow for completion of phase inversion of the polymer binder.

Preferably, they are then immersed in an excess of water (e.g. tap water) replaced periodically over a period of 48 hours in order to remove traces of the solvent (C).

Finally, the fibre precursors are calcined in air to yield ceramic hollow fibres with a predetermined sintering profile (L to P).

The sintering process reduces the size of the micro-structured tubes. This results in microtubes having the following properties: Outer diameter (Q); Inner diameter (R); Wall thickness (S); Micro-channel length (T); and Micro-channel width (U).

The table below shows the parameters, A to U, for three examples

| Parameter | Example 1 | Example 2 | Example 3 |
|---|---|---|---|
| A | Yttrium-stabilized zirconia (44 wt %) | Aluminium oxide (60 wt %) | Aluminium oxide (60 wt %) |
| B | Polyether sulfone (8 wt %) | Polyether sulfone (6 wt %) | Polyether sulfone (6 wt %) |
| C | N-methyl-2-pyrrolidone (33 wt %) | N-methyl-pyrrolidone (34 wt %) | Dimethyl sulfoxide (34 wt %) |
| D | polyethylene glycol (15 wt %) | Arlacel P135 (0.001 g/m$^2$) | Arlacel P135 (0.001 g/m$^2$) |
| E | 1.2 mm | 1.2 mm | 3 mm |
| F | 0.8 mm | 0.8 mm | 1.2 mm |
| G | 0 cm | 0 cm | 0 cm |
| H | 7 ml/min | 5 ml/min | 7 ml/min |
| I | N-methyl-2-pyrrolidone/water (95 wt %/5 wt %) | N-methyl-2-pyrrolidone/water (95 wt %/5 wt %) | Dimethyl sulfoxide |
| J | 12 ml/min | 3 ml/min | 5 ml/min |
| K | water | water | water |
| L | Room temperature to 600° C. at 2° C./min | Room temperature to 600° C. at 2° C./min | Room temperature to 600° C. at 2° C./min |
| M | Dwell for 2 hours | Dwell for 2 hours | Dwell for 2 hours |
| N | 600 to 1400° C. at 5° C./min | 600 to 1450° C. at 5° C./min | 600-1450° C. at 5° C./min |
| O | Dwell for 4 hours | Dwell for 4 hours | Dwell for 4 hours |
| P | 1400° C. to room temperature at 5° C./m | 1450° C. to room temperature at 5° C./min | 1450° C. to room temperature at 5° C./min |
| Q | 1.7 mm | 1.7 mm | 3 mm |
| R | 1.1 mm | 1.1 mm | 1.3 mm |
| S | 0.3 mm | 0.3 mm | 0.85 mm |
| T | 0.3 mm (100% of fibre wall) | 0.28 mm (93% of fibre wall) | 0.67 mm (78% of fibre wall) |
| U | 0.02 mm | 0.02 mm | 0.07 mm |

In an exemplary embodiment, the following method was used:

Arlacel P135 at a concentration of 1.3 wt % was dissolved in NMP/water solutions (having 95 wt % N-methyl-2-pyrrolidone and 5 wt % water) prior to the addition of aluminum oxide powders (58.7 wt %) at a ratio of 1:2:7 (for mean particle sizes 0.01 μm:0.05 μm:1 μm) The dispersion was rolled/milled with 20 mm agate milling balls with an approximate alumina/agate weight ratio of 2 for 48 hours. Milling was continued for a further 48 hours after the addition of polyether sulfone (6.1 wt %). The suspension was then transferred to a gas tight reservoir and degassed under vacuum until no bubbles could be seen at the surface.

After degassing, the suspension was transferred to a 200 ml Harvard stainless steel syringe and was extruded through a tube-in-orifice spinneret (with an inner diameter of 1.2 mm, and an outer diameter of 3.0 mm) into a coagulation bath containing 120 liters of water (a non-solvent for the polymer) with an air-gap of between 1-15 cm. Deionised water was used as the internal coagulant and the flow rate ranged from 3 to 21 ml/min. The extrusion rate of the spinning suspension and the flow rate of the internal coagulant were accurately controlled and monitored by two individual Harvard PHD 22/2000 Hpsi syringe pumps, ensuring the uniformity of the prepared precursor fibres.

The fibre precursors were left in the external coagulation bath overnight to allow for completion of phase inversion. They were then immersed in an excess of tap water which was replaced periodically over a period of 48 hours in order to remove traces of NMP. Finally, the fibre precursors were calcined in air (CARBOLITE furnace) to yield ceramic hollow fibre. The temperature was increased from room temperature to 600° C. at a rate of 2° C./min and held for 2 hours, then to the target temperature (1200° C. to 1600° C.) at a rate of 5° C./min and held for 4 hours. The temperature was then reduced to room temperature at a rate of 5° C./min.

EXAMPLES

Figure 7:
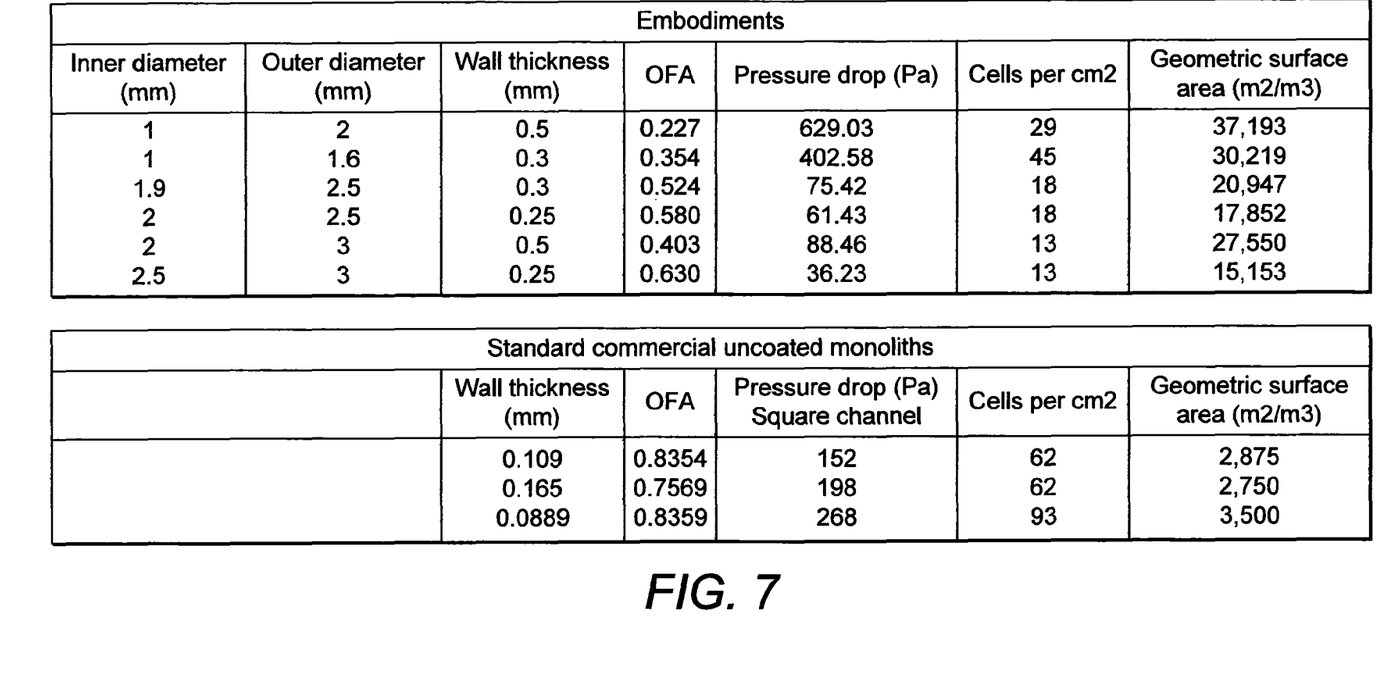
FIG. 7 shows a table comparing embodiments of the invention to conventional catalytic convertor substrates.

FIG. 7 shows a table comparing conventional catalytic convertor substrates with embodiments of the invention.

The pressure drop values were calculated based upon a catalytic convertor length of 0.152 m, with a gas viscosity of 1.9e-5 Pa·s, and a volumetric flow rate of 0.025 m3/s. The calculation used the following equation:

$$\text{deltaP} = 128 * mu * L * Q / pi * d^4$$

where deltaP=pressure drop, mu=gas viscosity, L=length, Q=volumetric flow rate, and d=channel diameter.

The table shows the number of cells per square cm. OFA is open frontal area (the ratio of the cross-sectional area that is open to the cross-sectional area that is obstructed by the end wall of the micro-structured tubes).

In each example embodiment, the cross-sectional area of the catalytic convertor substrate was 0.0162 m$^2$, which corresponds to that of the conventional substrates.

This cross-sectional area contains the following numbers of micro-structured tubes:
- 18,630 tubes of 1 mm outer diameter;
- 4,633 tubes of 2 mm outer diameter;
- 2,964 tubes of 2.5 mm diameter;
- 2,057 tubes of 3 mm diameter; and
- 1,159 tubes of 4 mm diameter As can be seen in FIG. 7, standard commercial monolith substrates typically have geometric surface areas in the region of up to about 5,000 $m^2/m^3$. Embodiments formed in accordance with the invention can achieve geometric surface areas in excess of 19,000 $m^2/m^3$. The geometric surface area values were measured using mercury intrusion.

Furthermore, not only can greater geometric surface areas be achieved, but also it can be seen that a low pressure drop can be achieved.

Figure 11:
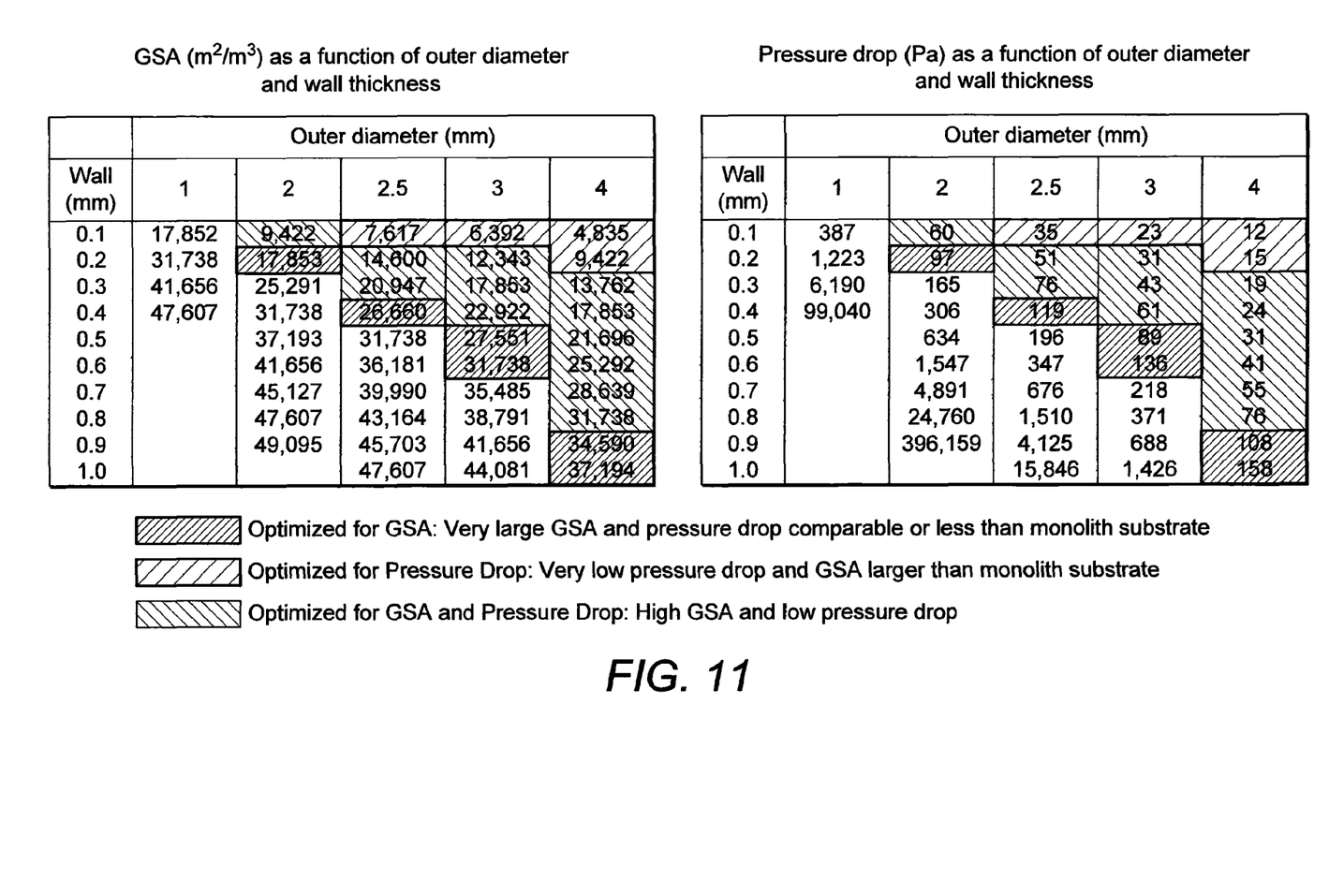
FIG. 11 shows a table of geometric surface areas and a table of pressure drops for combinations of wall thickness and outer diameter of micro-structured tubes.

Further data is shown in FIG. 11, which includes a table of geometric surface areas and a table of pressure drops for combinations of wall thickness and outer diameter measurements of micro-structured tubes. This data was obtained in the same manner as FIG. 7.

As can be seen in FIG. 11, advantageously low pressure drops can be obtained by embodiments of the invention in which the outer diameter is in the range from 2 mm to 4 mm and the wall thickness is in the range from 0.1 mm to 0.8 mm. Preferably, the outer diameter is in the range from 2.5 mm to 4 mm and the wall thickness is in the range from 0.1 mm to 0.2 mm.

At present, most catalytic convertor substrate have a geometric surface area of up to about 5,000 $m^2/m^3$ is sufficient for most automotive applications. As can be seen from the table, embodiments of the invention having outer diameters in the range from 2.5 mm to 4 mm and wall thickness in the range from 0.1 mm to 0.2 mm, provide such a geometric surface area, but also achieve an advantageously low pressure drop.

At present, most catalytic convertor substrate lead to pressure drops in the region of 100 Pa to 300 Pa. As can be seen from the table, embodiments of the invention having outer diameters in the range from 2 mm to 4 mm and wall thickness in the range from 0.2 mm to 1 mm, provide such a pressure drop, but also achieve an advantageously high geometric surface area. Preferably, the outer diameter is in the range from 2.5 mm to 4 mm and wall thickness in the range from 0.4 mm to 0.8 mm.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A catalytic converter substrate comprising a plurality of micro-structured tubes, each tube having an inside surface and an outside surface, wherein:
    at least one of the inside surface and the outside surface has a plurality of openings to micro-channels; and
    the micro-channels extend from said openings in the at least one surface towards the other surface.

2. The catalytic converter substrate of claim 1, wherein the tubes are ceramic tubes.

3. The catalytic converter substrate of claim 1, wherein the micro-channels extend from openings in the inside surface towards the outside surface.

4. The catalytic converter substrate of claim 1 wherein each tube comprises two distinct layers, the first layer containing the micro-channels extending from the inside surface and terminating within the tube cross-section and a second solid layer at the outside surface.

5. The catalytic converter substrate of any one of claim 4 wherein the second solid layer has a thickness of up to 70% of the thickness of the wall of the micro-structured tubes.

6. The catalytic converter substrate of claim 1, wherein the substrate comprises one or more of: cordierite; zirconia; yttrium stabilised zirconia; titania; silicon carbide; clay; alumina; stainless steel, FeCr alloys; alloys of iron; alloys of aluminium; or sintered metals.

7. The catalytic converter substrate of claim 1, wherein the GSA is in the range 8,000 $m^2/m^3$ to 15,000 $m^2/m^3$.

8. The catalytic converter substrate of claim 1 wherein the internal diameter of the micro-structured hollow tubes is from 0.5 to 4 mm.

9. The catalytic converter substrate of claim 1 wherein the wall thickness of the micro-structured hollow tubes is in the range 100 to 500 μm.

10. The catalytic converter substrate of claim 1 wherein the micro-channels have an entrance diameter of 5 μm to 200 μm.

11. The catalytic convertor substrate of claim 1 comprising a catalytically active coating.

12. The catalytic convertor substrate of claim 1 wherein the geometric surface area of the substrate is at least 19,000 $m^2/m^3$.

13. The catalytic convertor substrate of claim 12, wherein the geometric surface area of the substrate is in the range from 19,000 $m^2/m^3$ to 35,000 $m^2/m^3$.

14. The catalytic convertor substrate of claim 1, wherein:
    the outer diameter of the micro-structured tubes is in the range from 2 mm to 4 mm; and
    the wall thickness of the micro-structured tubes is in the range from 0.1 mm to 0.8 mm.

15. The catalytic convertor substrate of claim 1, wherein:
    the outer diameter of the micro-structured tubes is in the range from 2.5 mm to 4 mm; and
    the wall thickness of the micro-structured tubes is in the range from 0.1 mm to 0.2 mm.

16. The catalytic convertor substrate of claim 1, wherein the outer diameter of the micro-structured tubes is in the range from 2 mm to 4 mm; and the wall thickness of the micro-structured tubes is in the range from 0.2 mm to 1 mm.

17. The catalytic convertor substrate of claim 1, wherein the outer diameter of the micro-structured tubes is in the range from 2.5 mm to 4 mm; and the wall thickness of the micro-structured tubes is in the range from 0.4 mm to 0.8 mm.

18. A catalytic converter comprising a catalytic convertor substrate as set out in claim 1 and having a catalytically active coating, an insulation mat and a substrate housing.

19. The catalytic converter of claim 18 wherein the catalytically active coating is a washcoat.

20. The catalytic converter of claim 18 wherein the coating comprises a precious metal.

21. The catalytic converter of claim 20 wherein the precious metal is a platinum group metal.

22. The catalytic converter of claim 18, wherein the coating comprises a non-precious metal.

23. A kit for a catalytic converter, comprising;
    a catalytic convertor substrate as a set out in claim 1,
    an insulation mat; and
    a substrate housing formed to receive the substrate and mat with a tight fit.

24. An internal combustion engine exhaust system including a catalytic converter as set out in claim 18.

\* \* \* \* \*